United States Patent [19]

Miller

[11] Patent Number: 4,786,409
[45] Date of Patent: Nov. 22, 1988

[54] DUPLEX FILTER ASSEMBLY

[75] Inventor: Daniel W. Miller, Luckey, Ohio

[73] Assignee: Parker-Hannifin Corporation, Cleveland, Ohio

[21] Appl. No.: 40,468

[22] Filed: Apr. 20, 1987

[51] Int. Cl.⁴ .................. B01D 35/30; F16K 5/04; F16K 25/00; F16K 35/06

[52] U.S. Cl. ..................... 210/238; 210/341; 210/450; 251/174; 251/314; 251/104

[58] Field of Search ............ 210/340, 341, 238, 424, 210/450, 455, 333.1, 333.01; 251/174, 314, 316, 368, 104, 109; 137/625.47

[56] References Cited

U.S. PATENT DOCUMENTS

| | | | |
|---|---|---|---|
| 1,408,822 | 3/1922 | Mosher | 210/341 |
| 2,701,660 | 2/1955 | Voorheis | 210/341 |
| 3,618,781 | 11/1971 | Brown | 210/341 |
| 3,679,060 | 7/1972 | Smith | 210/333.1 |
| 3,900,401 | 8/1975 | Oliver et al. | 210/341 |
| 3,915,866 | 10/1975 | Brown et al. | 210/341 |
| 4,151,855 | 5/1979 | Levin et al. | 251/174 |
| 4,274,445 | 6/1981 | Cooper | 251/104 |
| 4,280,522 | 7/1981 | Pechnyo et al. | 251/174 |
| 4,372,530 | 2/1983 | Livorsi | 251/173 |
| 4,477,055 | 10/1984 | Partridge | 251/174 |
| 4,601,308 | 7/1986 | Stone et al. | 251/174 |

Primary Examiner—Benoît Castel
Assistant Examiner—Richard D. Jordan
Attorney, Agent, or Firm—Joseph B. Balazs

[57] ABSTRACT

Duplex filter apparatus suitable for pressure or suction applications includes dual filter housings and a central valve housing having dual, cylindrical, three-way plug valves. Four glass-filled Teflon sleeve seals, each having an inner cylindrical cut edge conform to the valve periphery and seal the valve openings in either a pressure or suction configuration. A wave spring biases each sleeve seal against the plug valve and further o-ring seals utilize the pressure or suction condition to enhance the effectiveness of the sleeve seals. In the pressure configuration a tubular support is used in conjunction with the sleeve seal with the wave spring acting either directly on the sleeve seal or indirectly through an intermediate metal ring which houses the o-ring seals and which minimizes thermal expansion effects. Interlock mechanisms are associated with a handle which rotates the plug valve between off-duty and on-duty filter housings to assure that the filter housing cover cannot be opened while on-duty, nor that the valve can be turned without the off-duty housing prepared for fluid. The interlock mechanisms comprise mechanical detents and levers interconnected with the handle and the filter housing covers.

11 Claims, 6 Drawing Sheets

DUPLEX FILTER ASSEMBLY

BACKGROUND OF THE INVENTION

This invention relates to hydraulic filters and more particularly to a dual filter arrangement which alternately and selectively establishes fluid communication and isolation for on-duty and off-duty filter elements and interlocks against inadvertent switchovers.

Conventional filter arrangements of this type are often large and unwieldy, of relatively high cost and require valving arrangements which have critical dimensions and which are difficult to manufacture. Typical of these are the ball valve type filter units which require precision machining and finishing of spherical surfaces and precise alignment techniques.

One example of prior art device is shown in U.S. Pat. No. 3,618,781. In this form of apparatus which describes dual filter housings and a central valve housing, upper and lower valve members are rotated by a common handle so that valving surfaces cooperate with valve seats formed in the bore of the valve housing in a metal to metal sliding valve arrangement.

Another example of prior art apparatus of this type is shown in U.S. Pat. No. 3,915,866. In this high pressure dual filter assembly, a central selector valve rotatably selects one of dual filter devices by means of a close, sliding, lapped fit between the ported valve member and the valve housing bore. In this arrangement, a balancing valve is utilized to supply fluid pressure to opposite sides of the selector valve to facilitate rotation of the latter.

SUMMARY OF THE INVENTION

The present invention comprises a duplex filter apparatus which is capable of use in relatively high pressure systems and which can be used for suction applications as well by modification of the sealing components.

The apparatus comprises on-duty and off-duty filter housings which are joined to a common, central valve housing having dual three-way valves therein for alternately selecting and isolating the filter housings. The valves are joined one above the other as a common unit for rotation by an external handle, in a bore of the valve housing. Sealing between the valve housing and the valve surfaces is effected by four glass-filled filled Teflon sleeve seals which are disposed in radial passages in the valve housing and which have cylindrical-cut inner sealing surfaces to conform to the cylindrical shape of the dual valves.

The sleeve seals are biased toward the valve structure by wave springs acting upon the outer end of the seals while additional o-ring seals are provided to seal the periphery of the sleeve seals and to establish a force condition under both pressure and suction variations to further urge the sleeve seals into engagement with the valve structures. In the pressure seal embodiment an additional sleeve support member is utilized to prevent collapse of the sleeve seal and in a further pressure seal embodiment, an additional metal ring is disposed between the wave seal and the sleeve seal to cooperate with two o-ring seals in order to avoid thermal expansion effects.

Interlocking means are provided to assure that the handle and the valve cannot be rotated until the off-duty housing is closed and prepared for receipt of fluid. Similarly, a juxtaposition of the valve handle and filter cover removal screw prevents opening of the on-duty housing cover so long as the handle is in a position where fluid is being applied to that housing.

DETAILED DESCRIPTION OF THE INVENTION

Figure 1:
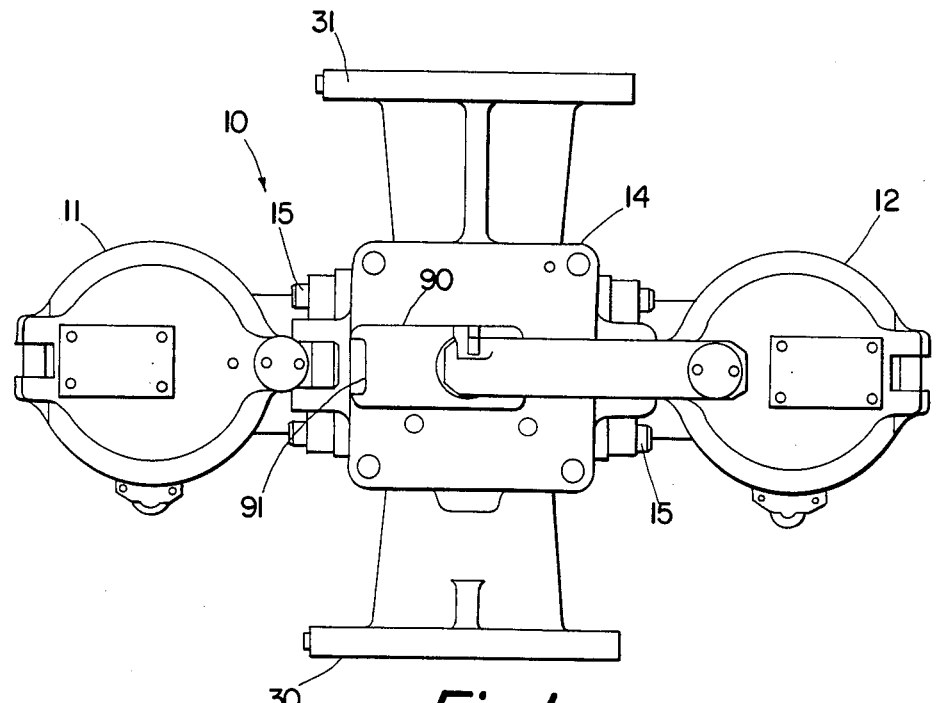
FIG. 1 is a plan view of the suction type duplex filter of the invention.
Figure 2:
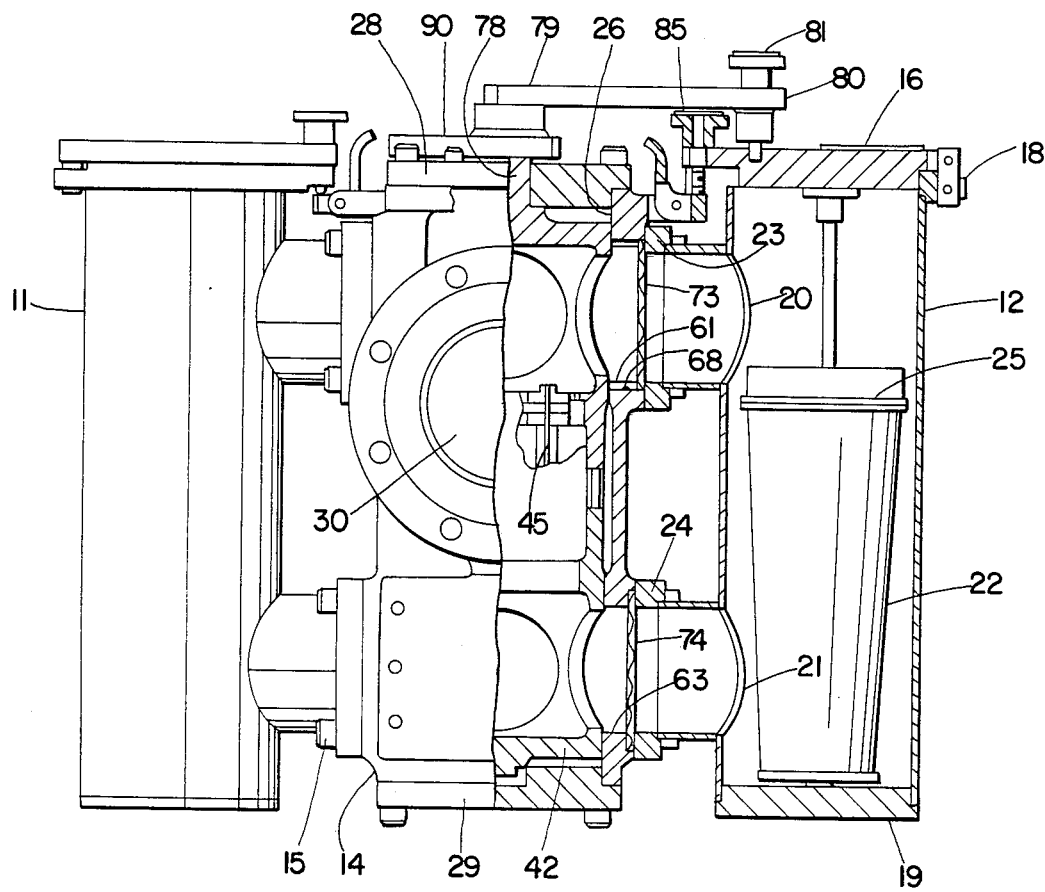
FIG. 2 is a part elevation, part sectional view of the suction type filter of FIG. 1.

Referring now to the drawings there is shown in FIGS. 1 and 2, a duplex filter assembly 10 comprising an off-duty filter housing 11, on-duty filter housing 12 and valve housing 14, interconnected by means of a plurality of bolts 15. Filter housings 11, 12 are a pair, only one of which is described in detail, consisting of a cylindrical housing 12, circular cover 16 pivotally attached at 18, bottom 19, inlet port 20, outlet port 21 and filter element 22 disposed therein between ports 20, 21. Each of ports 20, 21 consists of a radially oriented connecting tube which terminates respectively in flanges 23, 24 and which are joined to valve housing 14 by bolts 15. Filter element 22 may take many different forms, in this embodiment being a slightly tapered cylindrical member having filter media therein and supported on a flange within housing 12 with an o-ring seal 25.

Valve housing 14 is a generally rectangular enclosure having a central, axial bore 26 therein which extends the full length of housing 14 and which is closed at either end by bolted-on top cap 28 and bottom cap 29. Housing 14, perhaps better seen in the partial views of FIGS. 3 and 4 further includes inlet port 30 and outlet port 31, each having flanges thereon for connection to a fluid system.

Valve housing 14 further includes a pair of aligned upper inlet openings 32, 34 on opposite sides of housing 14 and at the upper portion of housing 14 for achieving fluid communication with the upper portions of filter housings 11, 12 by way of filter inlet port 20, for example. Upper inlet openings 32, 34 are short bores in the side wall of valve housing 14 and are radially disposed relative to bore 26 of valve housing 14. A further port opening 35 is provided in housing 14 intermediate upper inlet openings 32, 34 to place all of these openings in fluid communication with inlet port 30 of housing 14.

A similar set of openings is provided in the lower portion of valve housing 14 to provide fluid communication with outlet port 31 and to the lower portions of filter housings 11, 12 by way of filter outlet port 21, for example. These openings include aligned lower radial outlet openings 38, 39 and outlet port opening 40.

Valve member 42 is a generally cylindrical structure formed of two pieces but joined to form a common unit and which is slidably received in bore 26 of valve housing 14. Together with housing 14, valve member 42 forms a pair of three-way valves, commonly rotatable to control flow of fluid to and to isolate the filter housings 11, 12. The upper part of valve 42 is sealed from the lower part by inserted metal plate or partition 44 which is sealed on a flange therein and which may optionally support bypass valve 45 whose function of bypass of fluid from clogged filter elements, for example, is well known in this art. Bypass valve 45 is not shown in FIGS. 3 and 4 in order to simplify the drawings.

Figure 4:
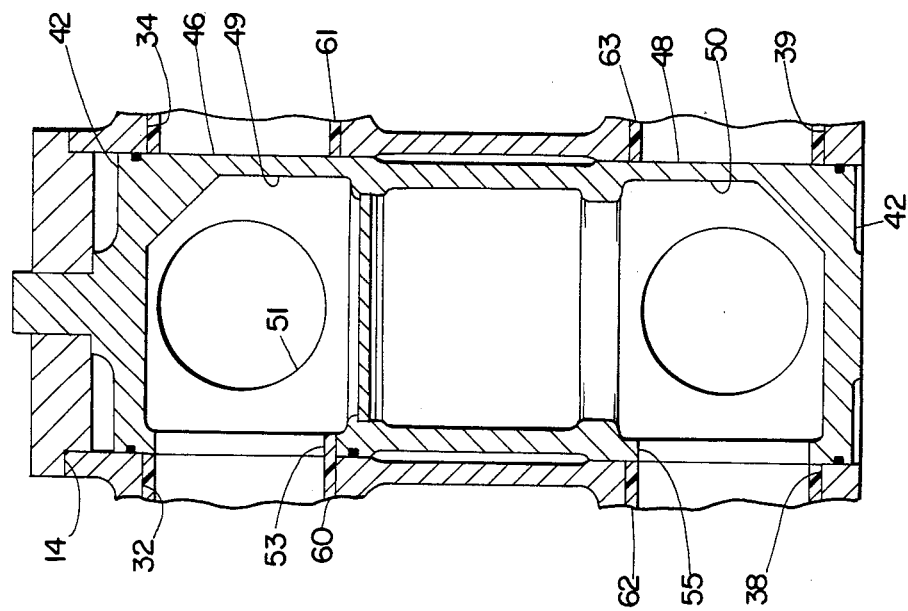
FIG. 4 is a sectional view in elevation of the valve housing and valve portion of the suction type filter rotated 90° from the view of FIG. 3, and showing the sleeve seals.
Figure 3:
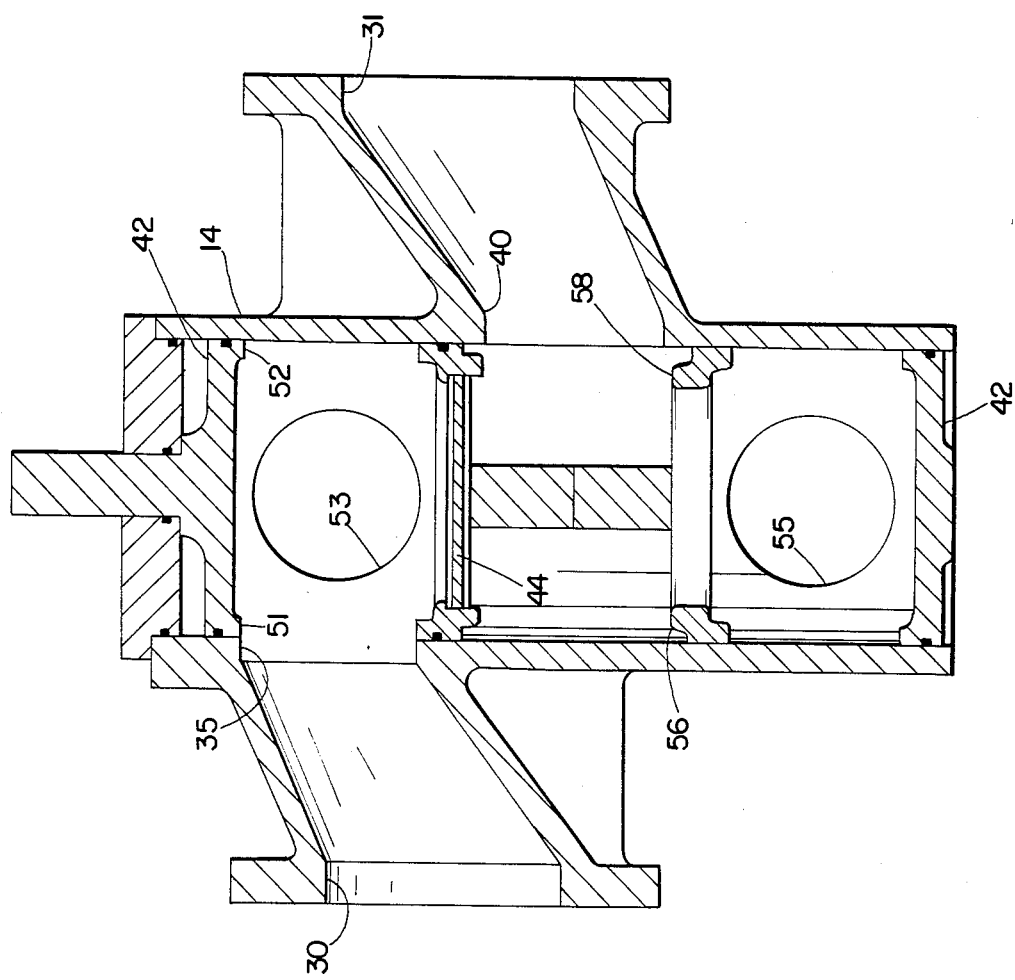
FIG. 3 is a sectional view in elevation of the valve housing and valve portion of the suction type filter.

Thus valve 42 consists of upper and lower peripheral sealing surfaces 46, 48 surrounding respective upper and lower chambers 49, 50 and having respective upper valve inlets 51, 52 and upper valve outlet 53 and lower valve inlet 55 and lower valve outlets 56, 58. With reference to FIGS. 3 and 4, it will be clear that upper valve outlet 53 is disposed between upper valve inlets 51, 52 and serves to direct fluid flow to valve housing inlet opening 32 and that lower valve inlet 55 is disposed between lower valve outlets 56, 58 and serves to receive fluid from valve housing outlet opening 38. Valve member 42 is sealed at appropriate locations about its periphery by o-ring seals to achieve a sealed rotary engagement with housing 14. However, different seals are required to each of the housing openings 32, 34, 38, 39 to seal about the respective valve outlet 53 and inlet 55 and to achieve a seal with housing 14.

Figure 6:
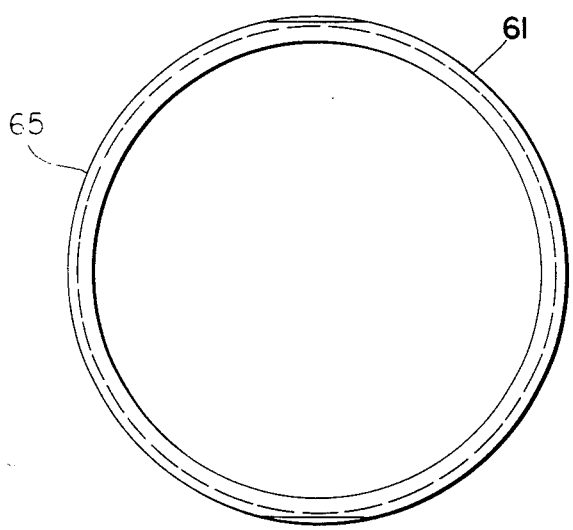
FIG. 6 is an enlarged plan view of one of the sleeve seals used in the suction type filter of FIGS. 1 and 2.
Figure 7:
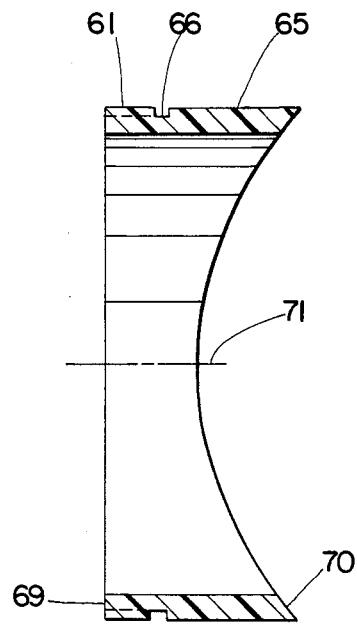
FIG. 7 is an enlarged sectional side-view of the sleeve seal of FIG. 6.

For this purpose, in each of housing openings 32, 34, 38, 39 is disposed a respective sleeve seal 60, 61, 62, 63 seen more clearly in FIGS. 6 and 7. All the sleeve seals are identical and only seal 61 is described as comprising a short tube having outer peripheral surface 65 in which is annular groove 66 for receipt of o-ring seal 68 and terminating at an outer seal edge 69 and an inner seal edge 70. Outer seal edge 69 is flat and normal to the axis 71 of sleeve seal 61 but inner seal edge 70 is curved being in the configuration of a cylindrical-cut matching the cylindrical peripheral surface 46 of valve member 42. Inner seal edge 70 is also normal to axis 71 of sleeve seal 61. In one embodiment of this invention sleeve seal 61 is on the order of five inches in diameter, having a side wall on the order of one-eighth inch in radial thickness and a length of about two inches. Sleeve seal 61 is preferably formed of glass-filled teflon material preferably in the range of 10–45% fiberglass. Teflon is utilized for its sliding characteristics as well as the ability to distort to some extend to achieve an optimum seal, while the fiberglass content is combined to achieve strength. Thus, the higher fiberglass content seals would be preferable for higher encountered pressure levels. Other forms of plastic materials could be suited for the sleeve seals for varying applications or purposes, for example, if corrosive qualities were of primary significance. Teflon is a trademark for a tetrafluoroethylene fluorocarbon polymer useful in the practice of this invention.

Figure 8:
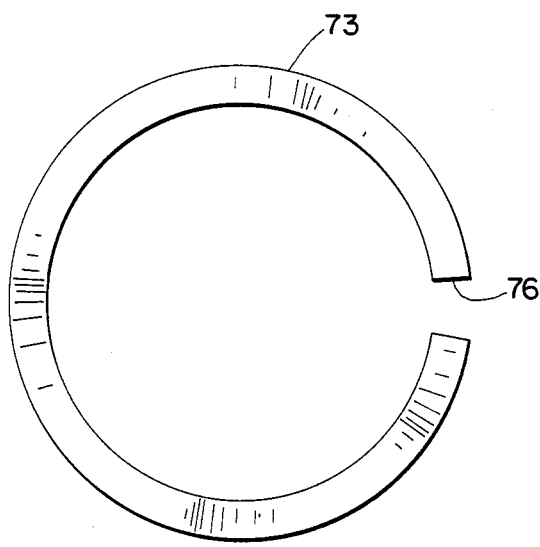
FIG. 8 is an enlarged plan view of one of the wave springs used in both the suction and pressure type filter units.
Figure 9:
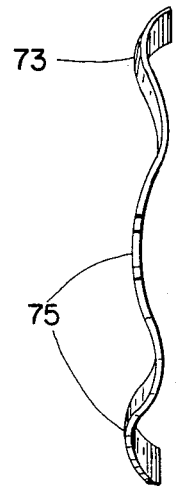
FIG. 9 is an enlarged side view of the wave spring of FIG. 8.

Each of the sleeve seals 60–63 is backed by a respective wave washer such as 73, 74 shown in association with seals 61, 63. Wave washer 73 is shown enlarged in FIGS. 8 and 9 as comprising a metal ring of spring steel having a plurality of axial waves or undulations 75 distributed about its circumferene and including gap 76 to allow expansion and contraction. Sleeve seal 61 and wave washer 73 are dimensioned for a loose fit in the bore forming valve housing opening 34 so that sleeve seal 61 may be urged by the bias of wave washer 73 into movement along the bore and into sealing engagement with peripheral surface 46 of valve member 42. Wave washer 73 directly engages sleeve seal 61 and both are retained in bore 34 by means of the engagement of flange 23 surrounding filter housing inlet port 20 and secured by bolts 15.

Referring again to FIGS. 1 and 2 it may be seen that valve member 42 includes support rod 78 passing through end cap 28 and secured to handle 79. Handle 79 has free end 80 carrying a spring-loaded detent pin member 81 overlying cover 16 of filter housing 12 with the pin of detent member 81 in engagement with a blind hole in cover 16 to assure proper orientation of valve member 42. In this disposition valve member 42 is oriented to provide fluid communication with on-duty filter housing 12, and to isolate off-duty filter housing 11.

Figure 5:
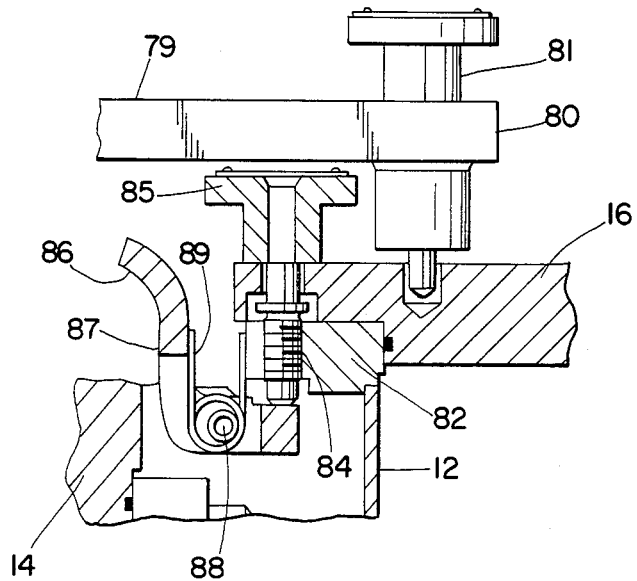
FIG. 5 is an enlarged sectional view of a part of the interlock mechanism shown in FIGS. 1 and 2.

As seen more clearly in FIG. 5 cover 16 is secured to flange 82 at the upper end of filter housing 12 by cover screw 84 which is threaded into flange 82 and includes knob 85 at its upper end for unthreading purposes. Since handle 79 overlies knob 85 it is not possible to unthread screw 84 and release cover 16 until handle 79 and valve 42 is rotated to an opposite position overlying off-duty filter housing 11, to establish that as the operating unit and to isolate filter housing 12 from the source of fluid under pressure. Handle 79 thus forms part of an interlock mechanism to prevent inadvertent opening of one of the filter housing 11, 12 while still under a pressurized condition.

A further part of the interlock mechanism includes handle lockout arm 86 being the curved end of an L-shaped lever 87 pivotably mounted to valve housing 14 by means of pin 88 and including hairpin spring 89 which urges lockout arm 86 toward handle 79. As seen in FIG. 5, when cover screw 84 is fully threaded to secure cover 16, the tip of screw 84 engages the end of lever 87 to pivot lockout arm 86 away from handle 79. Handle 79 includes an integral plate 90 having lockout pocket groove 91 at the end thereof, opposite to the free end 80 of handle 79. Thus, when lockout arm 86 enters lockout pocket 91, that is, when cover screw 84 has been unthreaded, then handle 79 is prevented from rotation and inadvertent switching thereof is avoided. This eliminates the chance of putting the off-duty housing 11 into service with its respective cover screw loose or the cover open.

Figure 12:
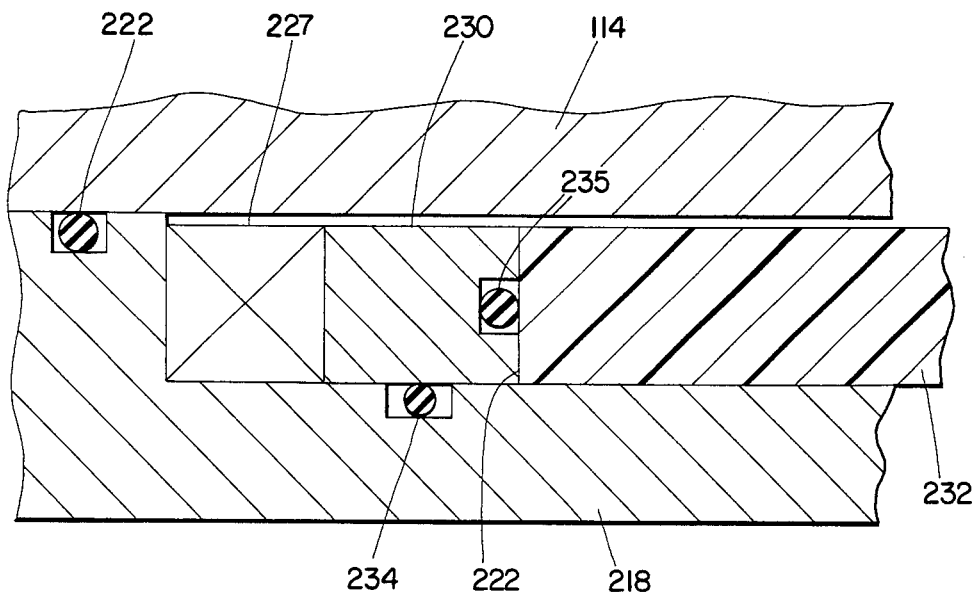
FIG. 12 is an enlarged sectional view of an alternate embodiment of sleeve seal and support structure for a pressure type duplex filter.
Figure 10:
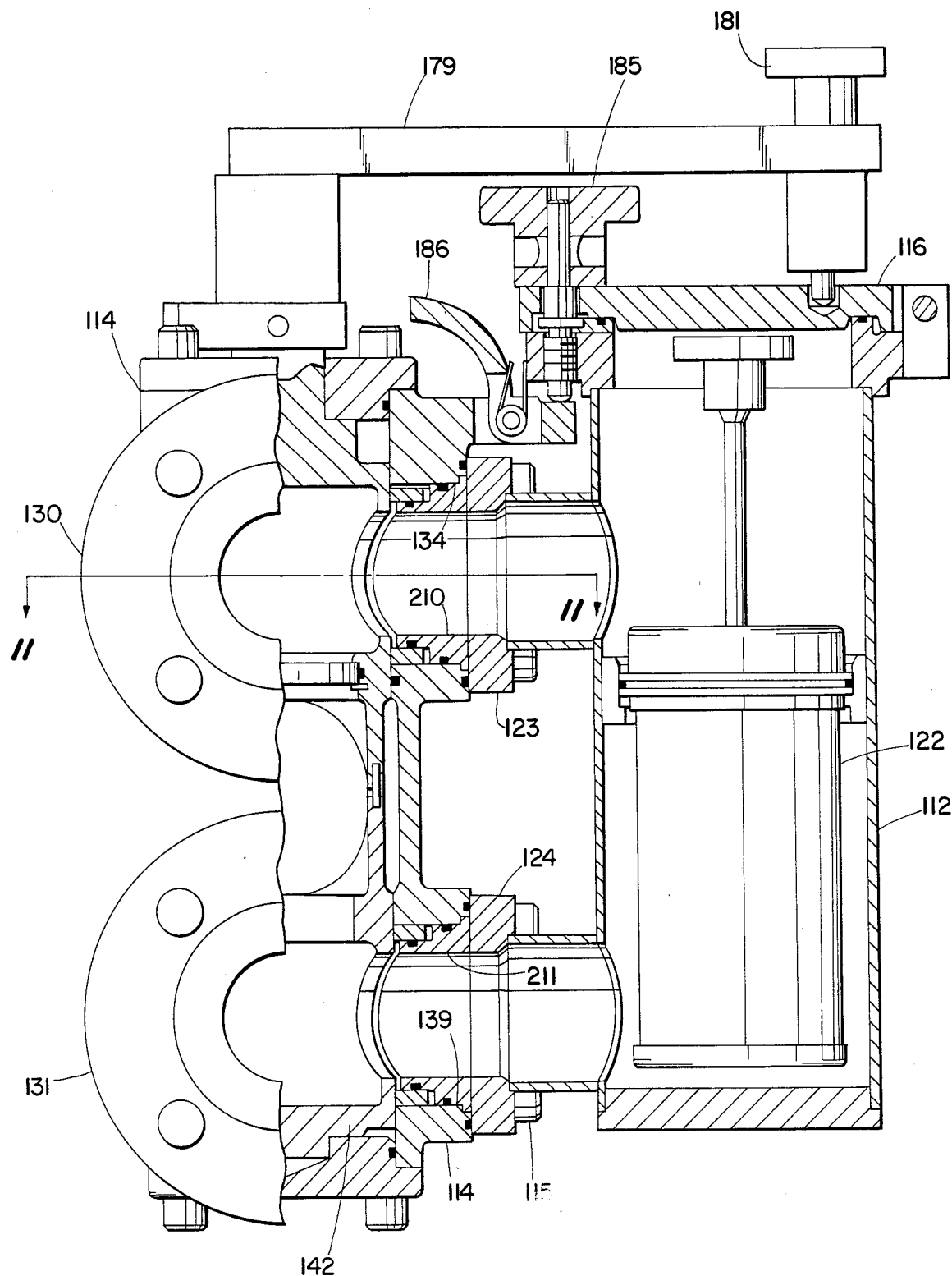
FIG. 10 is a part elevation, part sectional view of the pressure type duplex filter assembly of the invention.
Figure 11:
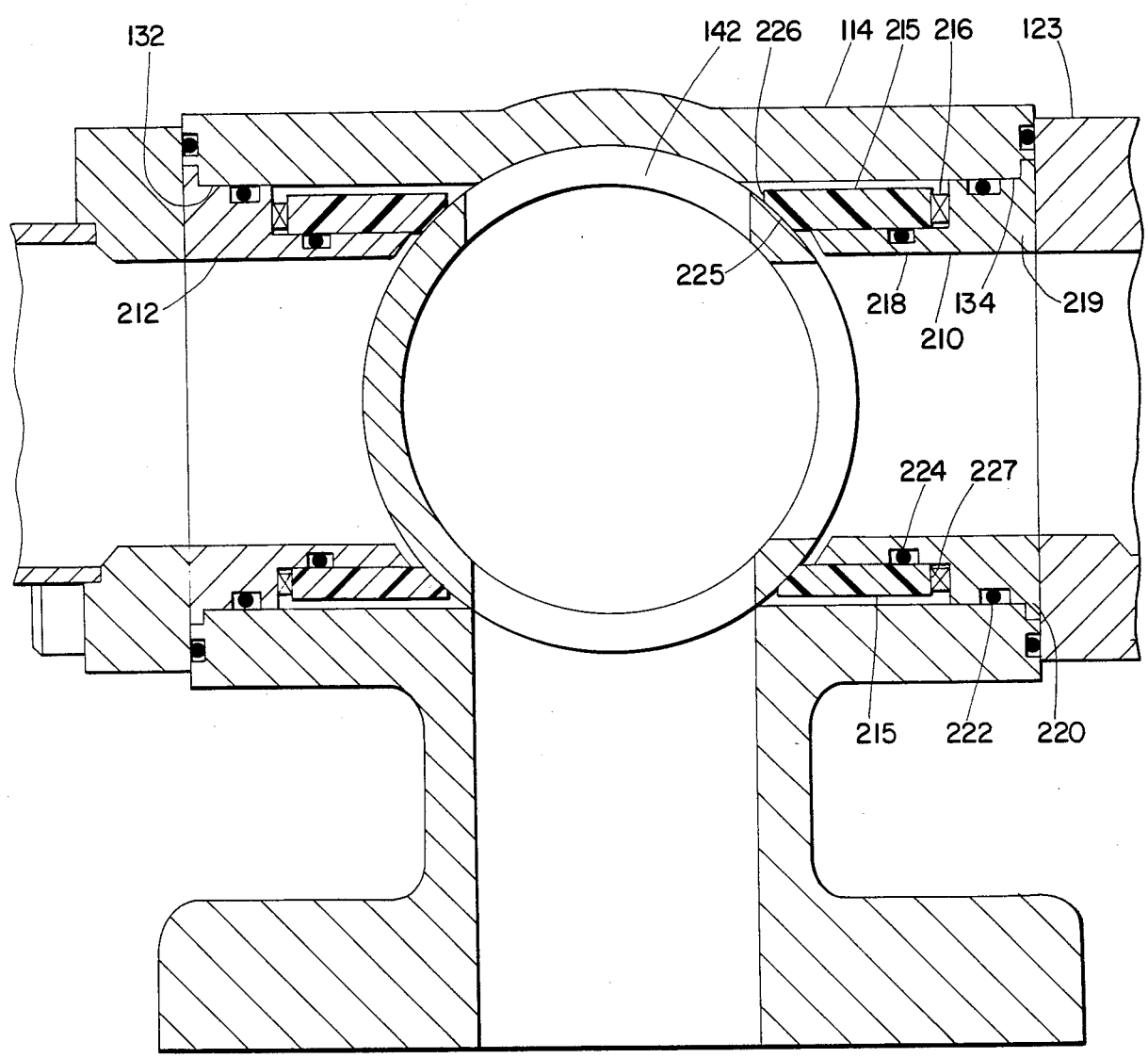
FIG. 11 is an enlarged sectional view of the pressure type duplex filter taken generally along the lines 11—11 of FIG. 10.

A pressure filter embodiment of the invention is depicted in FIGS. 10–12 with essentially the only change being the substitution of a different form of pressure sleeve seal. In this embodiment of the invention the same or similar components are described using the same reference numerals except that they are in the 100 series. Thus, valve housing 114 having valve element 142 therein is coupled to on-duty filter housing 112 having filter element 122 therein. Inlet port 130 and outlet port 131 are differently arranged in this embodiment, being on the same side of housing 114. However, a similar valving arrangement occurs to establish fluid communication through housing openings. In each of these openings is a sleeve seal assembly with assemblies 210, 211 shown in the openings 134, 139. In the top sectional view of FIG. 11 seal assembly 212 is shown, as well, in housing opening 132 and it will be understood that a similar assembly is included in housing openings 132, 138, 139.

Sleeve seal assembly 210 comprises a similar tubular sleeve seal 215, preferably formed of glass-filled Teflon, being biased toward valve element 142 by wave washer 216, similar to that previously described. In this embodiment however, tubular support 218 is provided closely adjacent the inner periphery of seleve seal 215 and including a radial flange 219 thereon slidably received in opening 134, against which wave washer 216 abuts. A further radial flange 220 at the outer end of support 218 is received in a notch at the outer end of opening 134 and is secured therein by abutment with flange 123 of filter housing 112 in a manner similar to that of the first embodiment of the invention.

An o-ring seal 222 received in a groove in the outer periphery of support flange 219 seals with housing 114 while o-ring seal 224 received in a groove in the outer periphery of sleeve support 218, seals with sleeve seal 215. By this arrangement, a pressure differential is set up on sleeve seal 215 to urge the latter further into engagement with valve member 142. Since the inner sealing face 225 of sleeve seal 215 is in engagement with valve member 142 only a small area 226 at the tip of the seal is exposed to fluid pressure. At the outer end 227 of sleeve seal 215 substantially the entire area is exposed as isolated by o-rings 222, 224 to provide a greater force urging the sleeve seal 215 into better sealing engagement. Such action enhances the sealing effect at higher fluid pressures where a better seal is required.

Another embodiment of pressure type seal is depicted in FIG. 12. This arrangement is similar in all respects to that described in FIGS. 10 and 11 except that a further metal ring 230 is inserted between wave spring 227 and slightly shorter but otherwise identical sleeve seal 232. Support member 218 receives o-ring 234 in a groove therein to seal the inner periphery of ring 230 while an additional o-ring 235 is employed as a face seal at the outer edge 227 of sleeve seal 232. In this arrangement, thermal expansion effects decreasing the efficiency of sleeve seal 232 are to a great extent minimized or altogether avoided.

I claim:
1. Duplex filter apparatus, comprising
a valve housing with a vertical central bore having an inlet port, an outlet port, a pair of inlet openings communicable with said inlet port and a pair of outlet openings communicable with said outlet port, said inlet and outlet openings comprising short transverse bores in said valve housing,
a pair of filter element housings each having an element inlet port and an element outlet port in fluid communication with said inlet and outlet openings of said valve housing,
a filter element disposed in each element housing between said respective element inlet and outlet ports,
a cylindrical plug valve in said housing central bore, said plug valve having respective upper and lower cylindrical peripheral sealing surfaces surrounding respective upper and lower chambers and having respective upper valve inlets and upper valve outlet and lower valve inlet and lower valve outlets, said plug valve being rotatable in said housing bore to alternatiely dispose said valve inlets and outlets in fluid communication with said housing inlet and outlet ports for alternate fluid flow through said filter elements, said peripheral sealing surfaces being positioned adjacent said respective housing inlet and outlet openings, and
tubular seal means disposed in said housing inlet and outlet openings in engagement with said peripheral sealing surfaces for sealing between said valve housing and said plug valve in both of the alternate positions of said plug valve, said seal means being guided in said inlet and outlet openings for axial movement toward and away from said plug valve, each said seal means being a short tube having a radial outer cylindrical peripheral surface supported and slidably received in a respective transverse valve housing bore and having an axially inner sealing edge formed in a cylindrical curve matching said peripheral sealing surface of said plug valve, and annular wave spring means in engagement with the axially outer edge of said seal means, biasing said seal means toward said plug valve for sealing engagement therewith.

2. The filter apparatus set forth in claim 1 wherein said seal means are formed of glass filled Teflon.

3. The filter apparatus set forth in claim 2 particularly suited for vacuum applications wherein said sealing means further comprises an o-ring seal on the outer periphery thereof engageable with said respective inlet and outlet openings of said valve housing.

4. The filter apparatus set forth in claim 2, particularly suited for pressure applications wherein each said sealing means further comprises a tubular support sleeve fixed to said housing and disposed within said sealing means for supporting said sealing means against collapse.

5. The filter apparatus set forth in claim 4 wherein said sealing means further comprises an o-ring seal for sealing against said support sleeve.

6. The filter apparatus set forth in claim 5 wherein said sealing means further comprises a support ring disposed between the outer edge of said sealing means and said wave spring and an o-ring seal in said support ring in engagement with said outer edge.

7. Duplex filter apparatus, comprising
a pair of filter housing, disposed on opposite sides of a central valve housing and interconnected in fluid communication therewith, a replaceable filter element in each of said filter housings,
cylindrical plug valve means in said central housing for directing fluid flow alternately to one of said filter housings and said respective filter element and for isolating the other of said filter housings for replacement of said filter element therein, said central housing having short transverse bores between said plug valve means and said filter housings,
tubular seal means disposed in said central housing transverse bores for sealing said plug valve means, each said tubular seal means being a short tube slidably received in said respective central housing transverse bore and having a cylindrically curved axial inner sealing edge in engagement with said plug valve means, spring means biasing said tubular seal means toward said plug valve means, each said filter housing having a cap at the upper end thereof for removal of said filter element in said housing, a handle affixed to said valve means for rotating said valve means to one or another position to establish fluid communication with one or the other of said filter housings, said handle being exterior of said valve housing and disposed to overlie one or the other of said filter housing caps to prevent removal of said respective cap when said valve means is in a position to establish fluid communication with said filter housing on which said cap is disposed, and spring biased lockout means interengageable with said handle for preventing movement of said handle when one or the other of said filter housing caps is in an open position.

8. The filter apparatus set forth in claim 7 wherein each said filter housing cap comprises an attachment device for securing said cap to said filter housing, said attachment device being engageable with said lockout means for actuation of the latter.

9. The filter apparatus set forth in claim 8 wherein said lockout means comprises a spring and lever and is urged to a position in engagement with said handle to prevent movement of said handle, said attachment means being operable to move said lockout means out of engagement with said handle to allow movement of the latter when said attachment means is in a cap-secured position.

10. The filter apparatus set forth in claim 9 wherein said handle is positionable in proximity to said attachment means to prevent actuation of said attachment means and removal of said respective filter housing cover.

11. The filter apparatus set forth in claim 10 wherein said attachment means comprises a screw member threaded into said filter housing, said handle being positionable to overlie said screw member to prevent unthreading of same.

* * * * *